US 9,393,731 B2

(12) United States Patent
Yokobayashi et al.

(10) Patent No.: US 9,393,731 B2
(45) Date of Patent: *Jul. 19, 2016

(54) BLOW MOLD UNIT AND BLOW MOLDING MACHINE USING SAME

(71) Applicant: NISSEI ASB MACHINE CO., LTD., Nagano (JP)

(72) Inventors: Kazuyuki Yokobayashi, Komoro (JP); Daizaburo Takehana, Komoro (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/610,846

(22) Filed: Jan. 30, 2015

(65) Prior Publication Data
US 2015/0140159 A1 May 21, 2015

Related U.S. Application Data

(63) Continuation of application No. 14/352,670, filed as application No. PCT/JP2012/077001 on Oct. 18, 2012, now Pat. No. 8,944,806.

(30) Foreign Application Priority Data

Oct. 18, 2011 (JP) .................................. 2011-228855

(51) Int. Cl.
*B29C 49/06* (2006.01)
*B29C 49/30* (2006.01)
(Continued)

(52) U.S. Cl.
CPC .............. *B29C 49/48* (2013.01); *B29C 49/062* (2013.01); *B29C 49/30* (2013.01); *B29C 49/70* (2013.01);
(Continued)

(58) Field of Classification Search
USPC .................. 425/182, 195, 525, 537, 540, 541
See application file for complete search history.

(56) References Cited

U.S. PATENT DOCUMENTS 4,365,950 A 12/1982 Harry et al.
4,648,824 A 3/1987 Aoki
(Continued)

FOREIGN PATENT DOCUMENTS

CN 201471719 5/2010
EP 2335903 A1 6/2011
(Continued)

OTHER PUBLICATIONS

International Search Report, International Application No. PCT/JP2012/07701.
(Continued)

*Primary Examiner* — Robert B Davis
(74) *Attorney, Agent, or Firm* — David L. Hoffman; Hoffman Patent Group

(57) ABSTRACT

A blow mold unit including a blow mold including first and second blow cavity split molds and a plurality of raised bottom molds, first and second pressure receiving plates, a first fixing plate to which the first blow cavity split mold and the first pressure receiving plate are fixed, a second fixing plate to which the second blow cavity split mold and the second pressure receiving plate are fixed, a third fixing plate interposed between the first and second fixing plates and to which the plurality of raised bottom molds are fixed at a first surface thereof, a shaft portion extending vertically from a second surface of the third fixing plate, an elevation guide block fixed to one of the first and second fixing plates and elevation guiding the shaft portion, and an elevating rod extending vertically from the second surface. There is also a blow molding machine which includes the blow mold unit.

8 Claims, 8 Drawing Sheets

(51) Int. Cl.
- *B29C 49/48* (2006.01)
- *B29C 49/70* (2006.01)
- *B29C 49/32* (2006.01)
- *B29C 49/54* (2006.01)
- *B29C 49/56* (2006.01)
- *B29C 49/64* (2006.01)

(52) U.S. Cl.
CPC .............. *B29C 49/061* (2013.01); *B29C 49/32* (2013.01); *B29C 49/541* (2013.01); *B29C 49/56* (2013.01); *B29C 49/6427* (2013.01); *B29C 49/6463* (2013.01); *B29C 2049/4869* (2013.01); *B29C 2049/4879* (2013.01); *B29C 2049/4892* (2013.01)

(56) References Cited

U.S. PATENT DOCUMENTS

| | | | |
|---|---|---|---|
| 5,496,166 | A | 3/1996 | Vogel et al. |
| 8,944,806 | B2 | 2/2015 | Yokobayashi et al. |
| 2005/0058741 | A1 | 3/2005 | Fujii et al. |
| 2008/0206387 | A1 | 8/2008 | Huang |
| 2012/0294974 | A1 | 11/2012 | Yokobayashi et al. |

FOREIGN PATENT DOCUMENTS

| | | |
|---|---|---|
| GB | 2062534 A | 3/1978 |
| JP | S60244518 | 12/1985 |
| JP | 06015726 A | 1/1994 |
| JP | 08-025469 | 1/1996 |
| JP | 08-230027 | 9/1996 |
| JP | 2005-066869 | 3/2005 |
| JP | 2010111053 A | 5/2010 |
| JP | 2011-111053 | 6/2011 |
| JP | 2011-156728 | 8/2011 |
| WO | 2010029848 A1 | 3/2010 |
| WO | 2011092985 A1 | 8/2011 |

OTHER PUBLICATIONS

Chinese Office Action "OA" dated Jun. 30, 2015.
European Search Report dated Jul. 15, 2015.

BLOW MOLD UNIT AND BLOW MOLDING MACHINE USING SAME

This application is a continuation of parent U.S. patent application Ser. No. 14/352,670, filed Apr. 17, 2014, becoming U.S. Pat. No. 8,944,806, and which parent application claims U.S. national stage application of International Patent Application No. PCT/JP2012/077001, having an international filing date of Oct. 18, 2012, which designated the United States and which claims priority from Japanese Patent Application No. 2011-228855, filed on Oct. 18, 2011, the entirety of all of which are incorporated herein by reference.

TECHNICAL FIELD

The present invention relates to a blow mold unit including a blow cavity split mold and a raised bottom mold and a blow molding machine using the blow mold unit.

BACKGROUND ART

In a blow molding machine, molds must be replaced according to containers to be blow molded. As a blow mold for blow molding a container from a preform, a pair of blow cavity split molds is necessary. In addition, in order that the bottom portion of a blow molded container can have an inward projecting shape such as a so called champagne bottom shape or a self-standing bottle shape, a raised bottom mold (raised bottom portion) is necessary as a blow mold. Also, in some cases, separately from the pair of blow cavity split molds, a pair of raised bottom molds which are clamped by the blow cavity split molds is necessary.

Patent document 1 discloses a blow mold unit in which a pair of blow cavity and raised bottom mold can be handled as an integral body when replacing molds.

CITATION LIST

Patent Document

Patent Document 1: JP-A-2011-156728

DISCLOSURE OF THE INVENTION

Problems that the Invention is to Solve

In a blow molding machine, since a plurality of containers are blow molded simultaneously from a plurality of preforms, a plurality of cavities must be formed in a pair of blow cavity split molds, and the same number of raised bottom molds as the number of cavities must be provided.

According to the patent document 1, since molds can be replaced in the unit of a blow mold unit in which the pair of blow cavities and the raised bottom mold are integrated, the efficiency of the mold replacing operation has been improved greatly. However, the plurality of raised bottom molds must be fixed to an elevating device provided to a main body side of the blow molding machine. This fixing operation is troublesome because of the narrow operation space and the like. Thus, the mold replacing operation needs further improvement.

It is an object of the invention to provide a blow mold unit, in which molds can be replaced in a unit of a blow mold unit in which a pair of blow cavities and a raised bottom mold are integrated, and the need to fix plurality of raised bottom molds to an elevating device provided to the main body side of a blow molding machine can be eliminated, and a blow molding machine using such blow mold unit.

Means for Solving the Problems (1) An aspect of the invention is related to a blow mold unit including: a blow mold including first and second blow cavity split molds to be clamped by bringing parting surfaces thereof into contact with each other, and a plurality of raised bottom molds that define a plurality of raised bottom shapes for a plurality of cavities defined by the first and second blow cavity split molds; first and second pressure receiving plates that receive mold clamping pressure by bringing parting surfaces thereof into contact with each other; a first fixing plate to which the first blow cavity split mold and the first pressure receiving plate are fixed; a second fixing plate to which the second blow cavity split mold and the second pressure receiving plate are fixed; a third fixing plate interposed between the first and second fixing plates and to which the plurality of raised bottom molds are fixed at a first surface thereof; at least one shaft portion extending vertically from a second surface of the third fixing plate opposed to the first surface; an elevation guide block fixed to one of the first and second fixing plates and elevation guiding the shaft portion; and an elevated member extending vertically from the second surface of the third fixing plate.

According to the aspect of the invention, in the third fixing plate for fixing the plurality of raised bottom molds, at least one shaft portion is held by the elevation guide block in such a manner that it can be lifted and lowered. The elevation guide block is fixed to one of the first and second fixing plates. Thus, on the first and second fixing plates, there are held not only the first and second blow cavity split molds and first and second pressure receiving plates but also the plurality of raised bottom molds through the elevation guide block and third fixing plate, whereby they can be handled as an integral body in a mold replacing operation. Further, simply by fixing the first and second fixing plates to the first and second mold clamping plates of the mold clamping/mold opening device provided in the blow molding machine, the operation to mount the blow mold unit onto the blow molding machine can be completed. The mold-clamping drive of the plurality of raised bottom molds can be realized by the elevating device of the blow molding machine driving the elevated member extending from the third fixing plate. Thus, the elevated members need not be connected to the elevating device. Especially, since the plurality of raised bottom molds are held by one of the first and second fixing plates by at least one shaft portion and elevation guide block, even when the first and second blow cavity split molds are opened by the first and second fixing plates in the mold replacing operation, the plurality of raised bottom molds will not drop.

Further, the plurality of raised bottom molds are moved laterally with the mold-opening movement of one of the first and second fixing plates and are removed from positions facing the bottom portions of the plurality of molded containers. Therefore, with use of this blow mold unit, for example, the take-out arm of a take-out device can be transferred to a position facing the bottom portion of the container without interference with the plurality of raised bottom molds.

(2) In the aspect of the invention, it is preferable that the blow mold unit further includes: a biasing member that biases the shaft portion with respect to the elevation guide block to release the plurality of raised bottom molds from the first and second blow cavity split molds.

Since the biasing member can release the plurality of raised bottom molds from the first and second blow cavity split molds, after the mold clamping drive of the elevating device is ended, the plurality of raised bottom molds can be released without relying on their own weights or the like.

(3) In the aspect of the invention, it is preferable that the elevation guide block includes a plurality of guide holes which are formed at line symmetrical positions with respect to a central position of an arranging direction of the plurality of raised bottom molds and elevation guide the plurality of shaft portions.

In this case, the plurality of raised bottom molds mold-clamping drive and mold-releasing drive can be carried out stably.

(4) In the aspect of the invention, it is preferable that the blow mold unit includes at least two elevated members, and the elevation guide block is interposed between the two elevated members.

(5) Another aspect of the invention is related to a blow molding machine including: a base; a blow mold unit according to one or more embodiments herein, which is supported on the base; a mold clamping/mold opening device provided on the base and drives the first and second fixing plates of the blow mold unit to clamp/open the first and second blow cavity split molds; and an elevating device that elevation drives the elevated members of the blow mold unit to lift and lower the plurality of raised bottom molds of the blow mold unit.

According to another aspect of the invention, as described above, the blow mold unit can be replaced as an integral body and thus the mold replacing operation can be simplified greatly.

(6) In the other aspect of the invention, it is preferable that, when the plurality of raised bottom molds are released, a clearance is formed between the elevated members and the elevating device.

Thus, even in the case that the elevated members and elevating device are disconnected from each other, when the elevation stroke of the elevating device is equal to or larger than the sum of the length of the clearance between the elevated member and elevating device and the moving stroke of the raised bottom mold, the plurality of raised bottom molds can be mold-clamping/mold-opening driven to the first and second blow cavity split molds.

(7) In the other aspect of the present invention, it is preferable that the blow molding machine further includes a take-out device that takes out a plurality of containers blow molded by the blow molding machine after the first and second blow cavity split molds are opened, and that the take-out device includes a take-out arm that can be carried into an area facing bottom portions of the plurality of containers.

In a blow molding machine according to another aspect of the invention, the raised bottom molds are moved laterally with the mold-opening movement of one of the first and second fixing plates and are removed from positions facing the bottom portions of the plurality of molded containers. Therefore, with use of this blow mold unit, the take-out arm of the take-out device can be transferred to a position facing the bottom portion of the container without interference with the plurality of raised bottom molds.

Effects of the Invention

According to the invention, it is possible to provide a blow mold unit, in which molds can be replaced in a unit of a blow mold unit in which a pair of blow cavities and a raised bottom mold are integrated, and further eliminates the need to fix the plurality of raised bottom molds to an elevating device provided to the main body side of a blow molding machine, and a blow molding machine using such blow mold unit.

MODE FOR CARRYING OUT THE INVENTION

Hereinafter, preferred embodiments of the invention will be specifically described. Here, the embodiments described hereinafter do not limit the contents of the invention disclosed in the scope of the appended claims. All of structures described in the embodiments are not always essential as the solving means of the invention.

1. Blow Molding Machine

Figure 1:
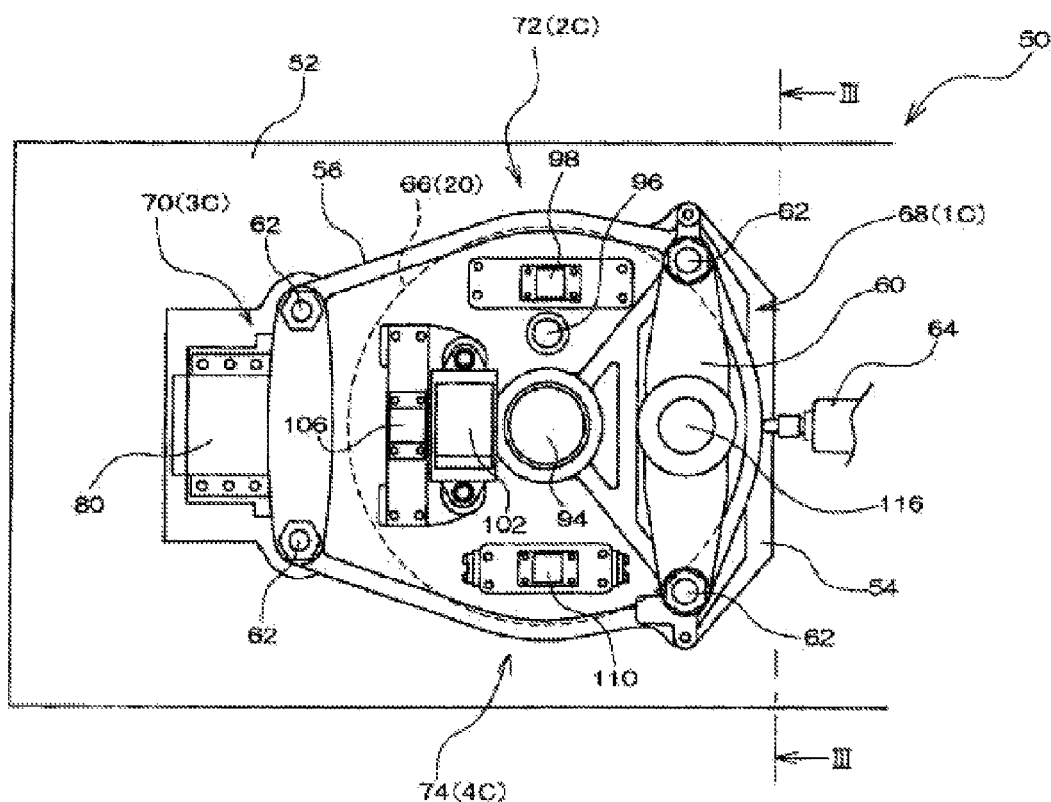
FIG. 1 is a plan view of a blow molding machine according to an embodiment of the invention.
Figure 2:
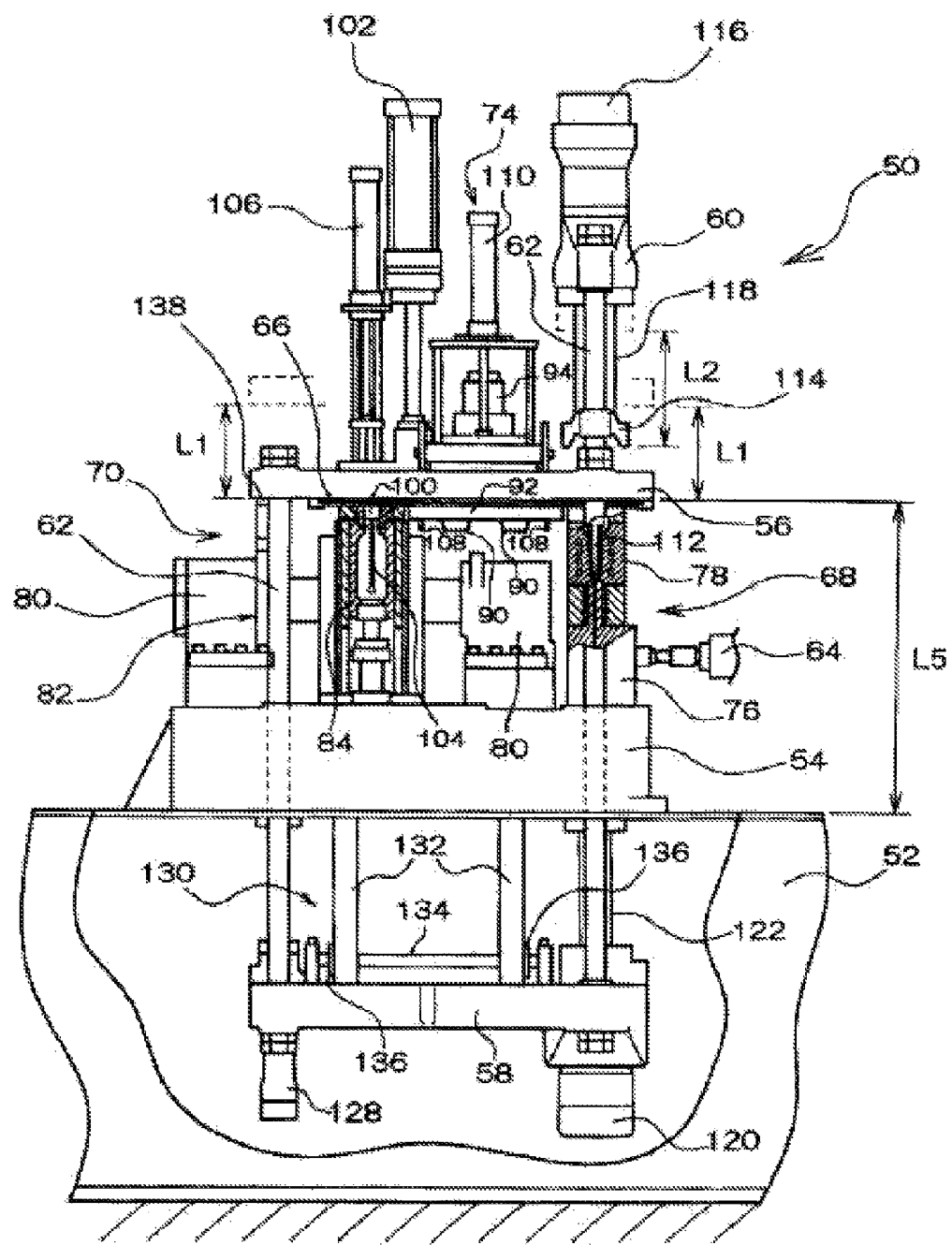
FIG. 2 is a front view, broken in part, of the blow molding machine shown in FIG. 1.
Figure 3:
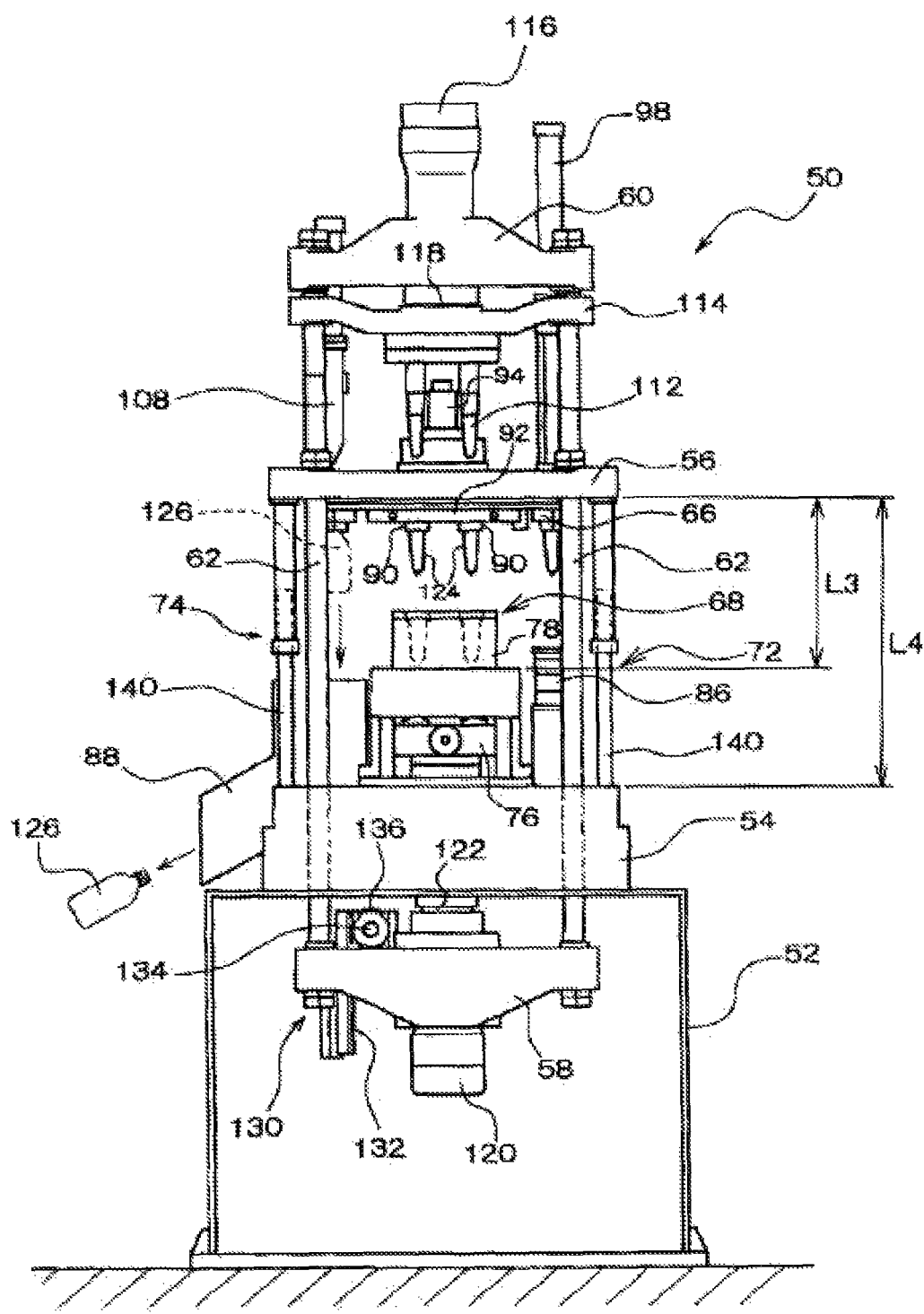
FIG. 3 is a section view taken along the III-III line shown in FIG. 1.

Firstly, description is given of an example of a blow molding machine to which the invention is applied. FIG. 1 shows, for example, a blow molding machine 50 of four stations. The molding machine 50, as shown in FIGS. 2 and 3, includes a machine base 52, a lower base 54, an upper base 56, a traction plate 58, and a cylinder fixing plate 60, while the upper base 56, traction plate 58 and cylinder fixing plate 60 are connected and fixed by a plurality of, for example, four tie bars (see FIG. 1) penetrating through the lower base 54.

The machine base 52 has a hollow box shape, while an injection apparatus 64 is mounted on one side of the upper surface of the machine base 52. The lower base 54 is fixed to the upper surface of the other side of the machine base 52. The upper base 56 is disposed above the lower base 54 with a given clearance between them and rotatably supports a rotary disc 66 on the lower surface side thereof.

The upper base 56 is also connected and fixed to intermediate positions of two tie bars 62 on the injection apparatus 64 side and the upper ends of two tie bars 62 on the opposite side to the injection apparatus 64.

Plurality of processing stations 1C~4C are arranged at the plurality of rotation stop positions of the rotary disc 66 existing in a space between the lower and upper bases 54, 56 above the machine base 52. As shown in FIG. 1, an injection molding station 68(1C) is formed on the injection apparatus 64 side, a blow molding station 70(3C) is formed at a position opposite to the station 68(1C), and a temperature regulating station 72(2C) and a take-out station 74(4C) are formed at positions intersecting at 90° with the injection molding station 68 and blow molding station 70.

In the injection molding station 68, as shown in FIG. 2, an injection cavity mold 78 is mounted on the lower base 54 through a hot runner mold 76 nozzle-touchable with the injection apparatus 64.

In the blow molding station 70, similarly as shown in FIG. 2, there is provided on the lower base 54 a blow cavity mold 84 constituted of a split mold which can be mold clamped by a blow mold clamping mechanism (mold clamping/mold opening device) 82 including a blow mold clamping cylinder 80. Here, a raised bottom mold is not shown in FIG. 2.

In the temperature regulating station 72, as shown in FIG. 3, a temperature regulating pot 86 is fixed to the top of the lower base 54.

In the take-out station 74, as shown in FIG. 3, a shooter 88 for taking out a molded product is mounted on the lower base 54.

On the lower surface of the rotary disc 66, a plurality of, for example, two neck molds 90 are arranged respectively according to the respective positions of the injection molding station 68, temperature regulating station 72, blow molding station 70 and take-out station 74.

The neck molds 90 are respectively configured by split molds and are respectively mounted on neck support plates 92 configured by split plates, while the neck molds 90 can be opened and closed by opening and closing the neck support plates 92. In the injection stretch blow molding machine 50, the neck molds 90 and neck support plates 92 for supporting the same openably and closably configure a transfer member to be supported by the rotary disc 66.

The rotary disc 66 can be rotated intermittently by 90° by an electric motor 94 provided on the upper board 56 and is capable of transferring sequentially the neck molds 90 to the injection molding station 68, temperature regulating station 72, blow molding station 70 and take-out station 74.

Here, the rotation stop position of the rotary disc 66 is determined by a positioning mechanism 96. However, it may also be determined only by the positioning means of a servo motor.

On the upper base 56, there are provided, for example, a temperature regulating core elevating cylinder 98 situated at the corresponding position of the temperature regulating station 72 for lifting and lowering a temperature regulating core (not shown), a blow core mold elevating cylinder 102 situated at the corresponding position of the blow molding station 70 for elevating a blow core mold 100 and a stretch rod elevating cylinder 106 for lifting and lowering a stretch rod 104, and an eject cam elevating cylinder 110 situated at the corresponding position of the take-out station 74 for lifting and lowering an eject cam 108 for opening the neck support plates 92.

The cylinder fixing plate 60 is fixed to the upper ends of the two tie bars 62 situated on the injection molding station 68 side above the upper base 56 and, between the cylinder fixing plate 60 and upper base 56, there is interposed an injection core mold clamping plate 114 with an injection core mold 112 mounted thereon in such a manner that it can be lifted and lowered along the two tie bars 62. Here, a cooling medium circulates in the injection core mold 112 but description is omitted of a device for circulating the cooling medium.

Also, on the cylinder fixing plate 60, there is mounted an injection core mold clamping cylinder 116, while the leading end of the piston 118 of the injection core mold clamping cylinder 116 is connected to the injection core mold clamping plate 114.

The traction plate 58 is connected and fixed to the lower ends of the four tie bars 62 within the machine base 52. On the traction plate 58, at a position below the injection molding station 68, there is mounted a neck mold clamping cylinder 120 serving as vertical mold clamping means, while the piston 122 of the neck mold clamping cylinder 120 is connected to the lower surface of the lower base 54. Here, the vertical mold clamping mechanism of the upper base 56 is configured by the traction plate 58, tie bars 62 and cylinder 120.

Therefore, as shown in FIG. 3, in a state where the traction plate 58 is lifted, when the neck mold clamping cylinder 120 is driven, with the lowering motion of the traction plate 58, the tie bars 62 are towed and lowered and, as shown in FIG. 2, the upper base 56 connected and fixed to the tie bars 62 is lowered by an amount equivalent to a stroke L1. Thus, the neck mold 90 mounted on the rotary disc 66 is lowered and, for example, in the injection molding station 68, the neck mold 90 is mold-clamped relative to the injection cavity mold 78.

Here, on the blow molding station 70 side, the lower surface of the upper base 56 is contacted with a stopper 138 provided on the upper portion of the blow mold clamping mechanism 82 and is positioned at the lower limit position of the upper base 56.

Further, in the temperature regulating station 72 and blow molding station 70, the blow cavity mold 84 is clamped to the neck mold 90 by the temperature regulating pot 86 and blow mold clamping mechanism 82.

Simultaneously when the upper base 56 lowers, the cylinder fixing plate 60 fixed to the upper ends of the two tie bars 62 on the injection molding station 68 side lowers by the same stroke L1 as the upper base 56.

In this state, in the injection molding station 68, by driving the injection core mold clamping cylinder 116, the injection core mold clamping plate 114 is lowered by a stroke L2 to thereby clamp the injection core mold 112 and neck mold 90, and the injection apparatus 64 injects molten resin into the injection cavity mold 78 to injection mold a preform 124.

In this case, since the injection core mold clamping cylinder 116 lowers integrally with the upper base 56 with the lowering motion thereof, it can keep the distance constant from the upper base 56.

Therefore, since the lowering stroke L2 of the injection core mold clamping cylinder 116 provides the smallest stroke between the retreating position of the injection core mold 112 from the rotary disc 66 and the clamping position, the length of the injection core mold clamping cylinder 116 can be shortened.

Also, since the injection core mold clamping cylinder 116 only needs to provide a mold clamping force capable of clamping the injection core mold 112, the injection core mold clamping cylinder 116 can be formed to have a relatively small size.

Here, simultaneously with the molding operation of the injection molding station 68, in the temperature regulating station 72, the temperature regulating core elevating cylinder 98 is operated to insert a temperature regulating core (not shown) into the temperature regulating pot 86 to regulate the temperature of the preform 124.

Also, in the blow molding station 70, the blow core mold elevating cylinder 102 is operated to lower the blow core mold 100 to mold clamp the blow core mold 100 to the neck mold 90, and the stretch rod elevating cylinder 106 is operated to lower the stretch rod 104 to supply blow air into the blow cavity mold 84, whereby the temperature regulated preform 124 is two-axis stretch blown to mold a container (bottle) 126.

Further, in the take-out station 74, the eject cam 108 is lowered by the eject cam elevating cylinder 110 to open the neck mold 90 through the neck support plate 92, the container 126 is dropped down, and the container 126 is discharged out of the apparatus by the shooter 88. Here, since a pair of split plates configuring the neck support plate 92 is normally closed by a spring, the neck mold 90 is held in a mold clamped state. Also, the paired split plates include wedge holes respectively formed in their two end portions in the longitudinal direction thereof. The mold opening of the neck mold 90 is attained by lowering the eject cam 108 (which is driven by the eject cam elevating cylinder 110) toward the wedge holes to open the split plates.

Next, after the respective molding processes are ended, the blow mold clamping mechanism 82 is operated to open the blow cavity mold 84; the neck mold clamping cylinder 120 is operated to elevate the upper base 56; and the injection core mold clamping cylinder 116, temperature regulating core elevating cylinder 98, blow core mold elevating cylinder 102, stretch rod elevating cylinder 106 and eject cam elevating cylinder 110 are operated to retreat the injection core mold 112, temperature regulating core, blow core mold 100, stretch rod 104 and eject cam 108 from their positions in the rotary disc 66, whereby the rotary disc 66 becomes rotatable.

In this state, when the electric motor 94 is operated to rotate the rotary disc 66 intermittently, the processings in the respective processing stations can be carried out sequentially.

Also, at a position below the blow molding station 70 of the traction plate 58, there is provided an auxiliary mold clamping cylinder 128. The leading end of a piston (not shown) of the auxiliary mold clamping cylinder 128 is connected to the lower base 54 to enable the elevating and lowering motion of the upper base 56 to balance well on the injection molding station 68 side and on the blow molding station 70, whereby it can be lifted and lowered smoothly.

Further, the machine base 52 includes synchronizing means 130 for synchronizing the neck mold clamping cylinder 120 and auxiliary mold clamping cylinder 128.

The synchronizing means 130 includes two racks 132 respectively hanging down on the injection molding station 68 side and blow molding station 70 side of the lower base 54, a rotation shaft 134 stretched between the injection molding station 68 and blow molding station 70 of the traction plate 58, and two pinions 136 fixed to the rotation shaft 134 and meshing with the respective racks 132. Here, in the injection molding station 68 as well, there is provided a stopper rod 140 for restricting supplementary the lowering limit of the upper base 56.

Here, a blow mold unit 200 to be described below can be applied not only to the four-station blow molding machine 50 described above using FIGS. 1 to 3 but also to a three-station blow molding machine of a rotary transfer type, and a blow molding machine that linearly transfers a preform and a container. It also can be applied to an injection blow molding machine not requiring a stretch processing.

2. Blow Mold Unit

Figure 4:
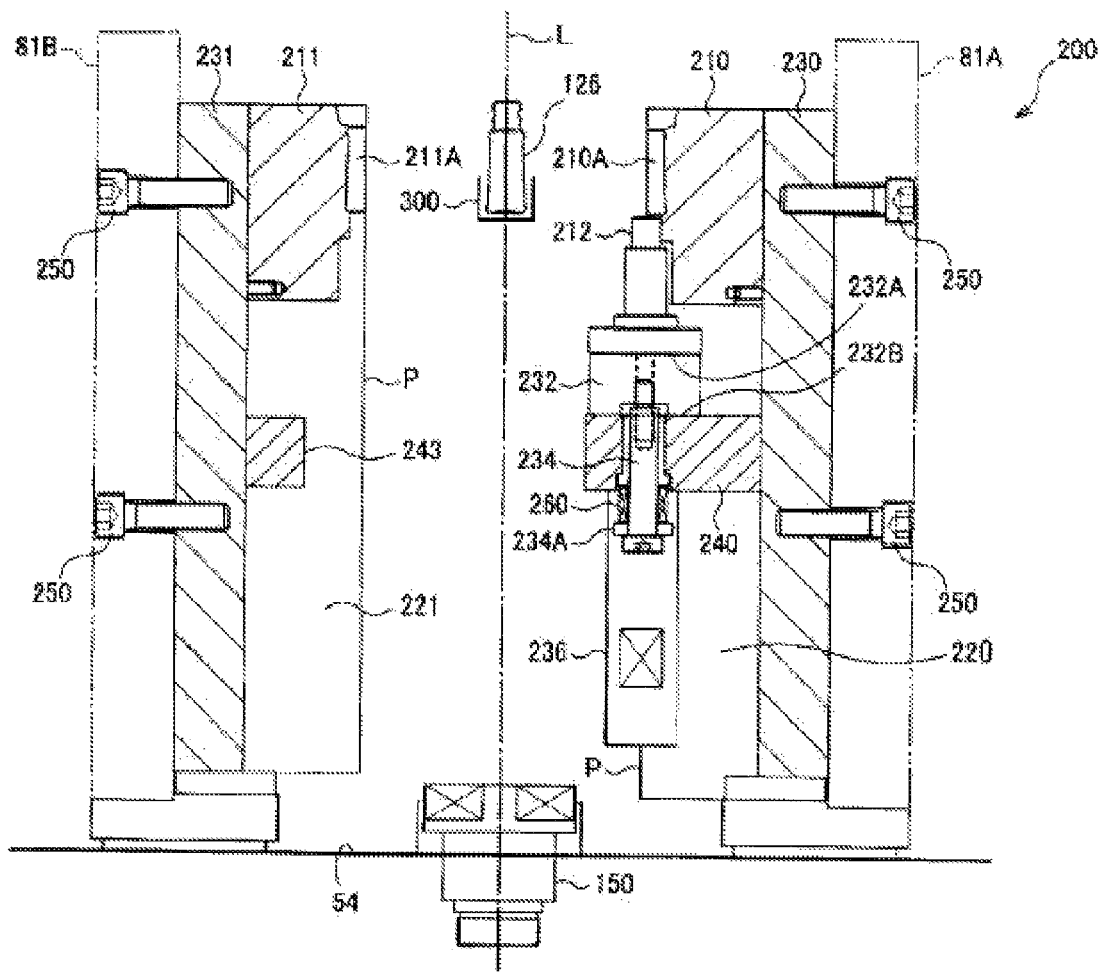
FIG. 4 is a side view of a blow mold unit mounted on a blow molding machine.

Next, description is given of a blow mold unit 200 with reference to FIGS. 4 to 7. FIG. 4 is a side view of a blow mold unit 200 mounted on the blow molding machine 50. In FIG. 4, as the structural components of the blow molding machine 50, there are shown the lower base (base) 54 shown in FIG. 2, first and second mold clamping plates 81A, 81B to be driven by a mold clamping/mold opening device 82, and an elevating device 150 such as a hydraulic cylinder.

Figure 5:
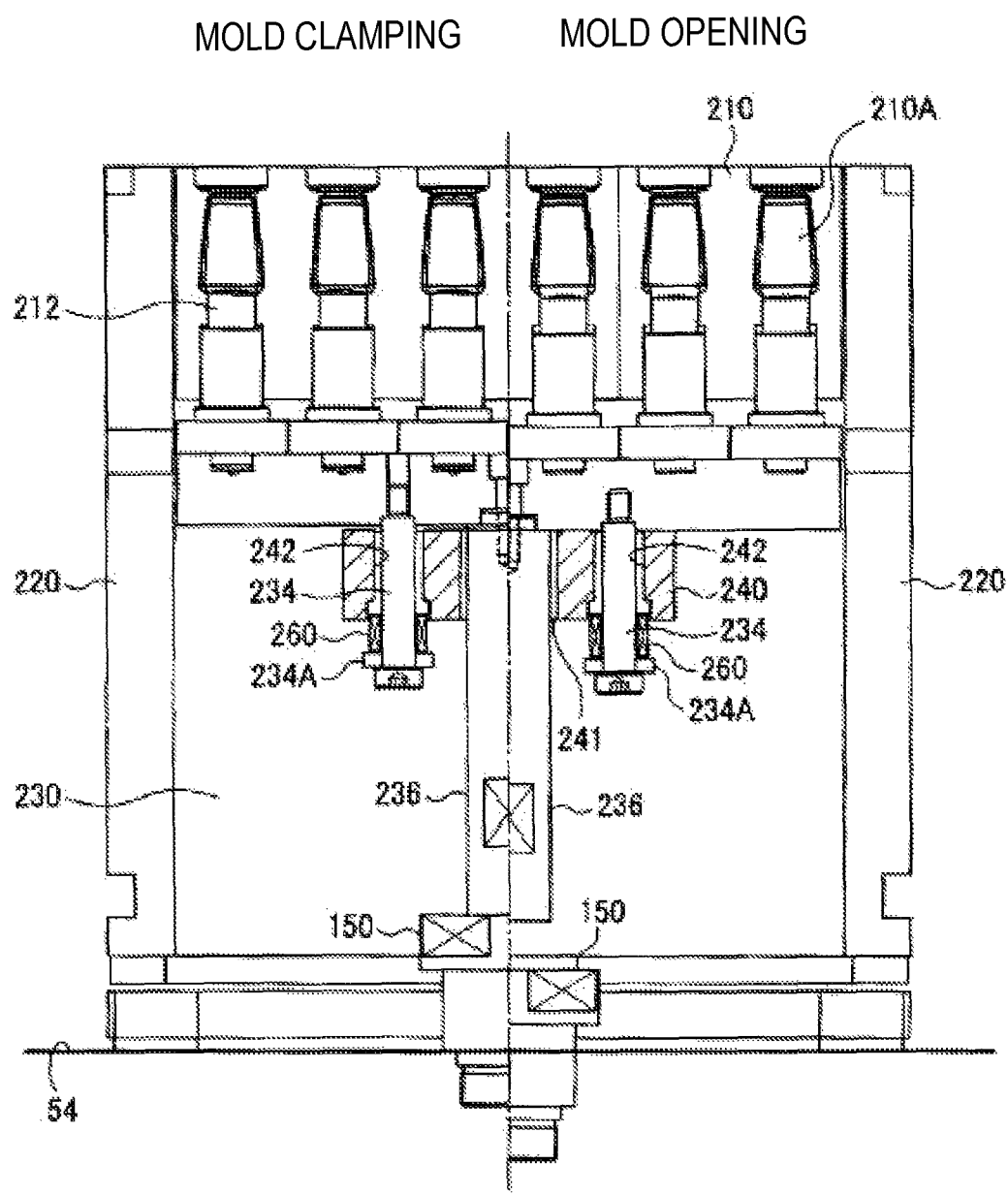
FIG. 5 is a front view of a first blow cavity split mold mounted on the first fixed plate side, while the left half thereof shows a mold clamped state and the right half a mold opened state.
Figure 6:
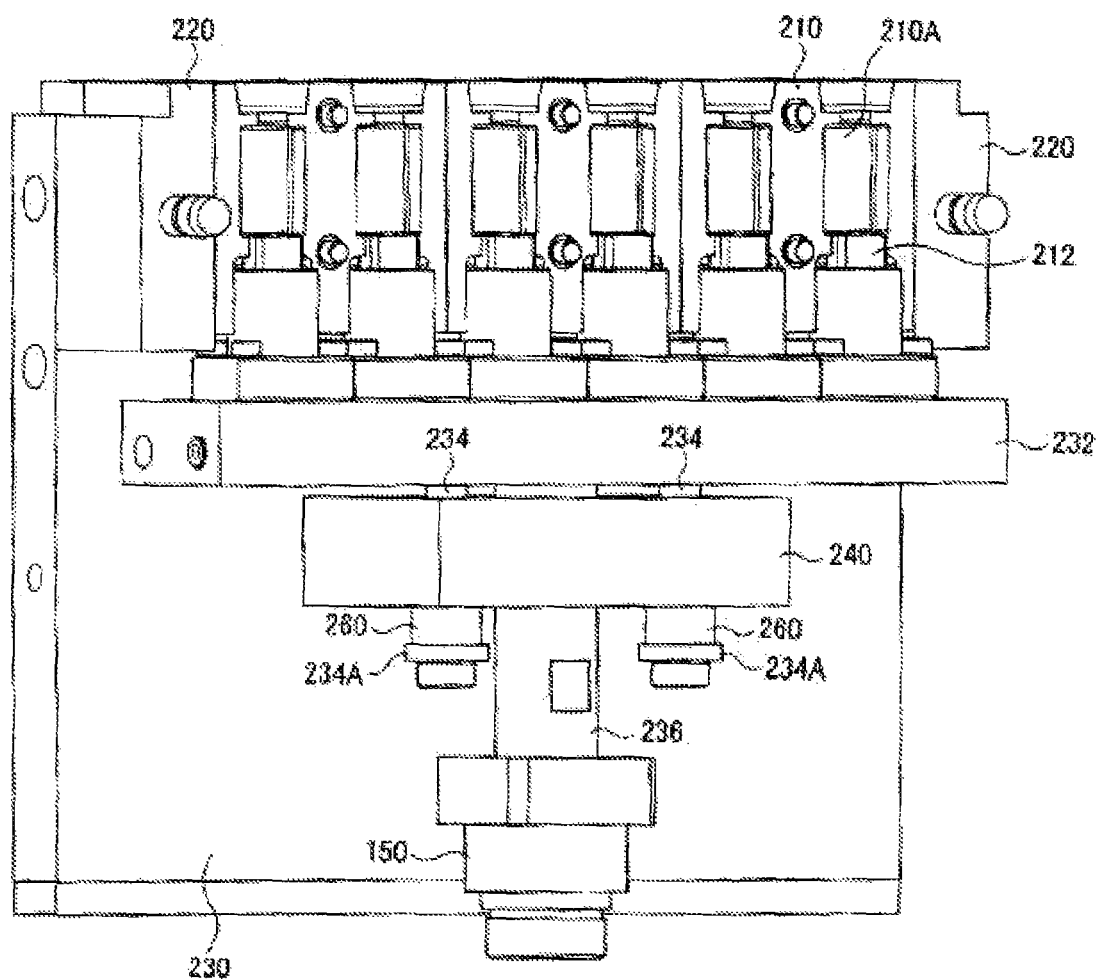
FIG. 6 shows the mold clamped state of raised bottom molds mounted on the first fixed plate side.
Figure 7:
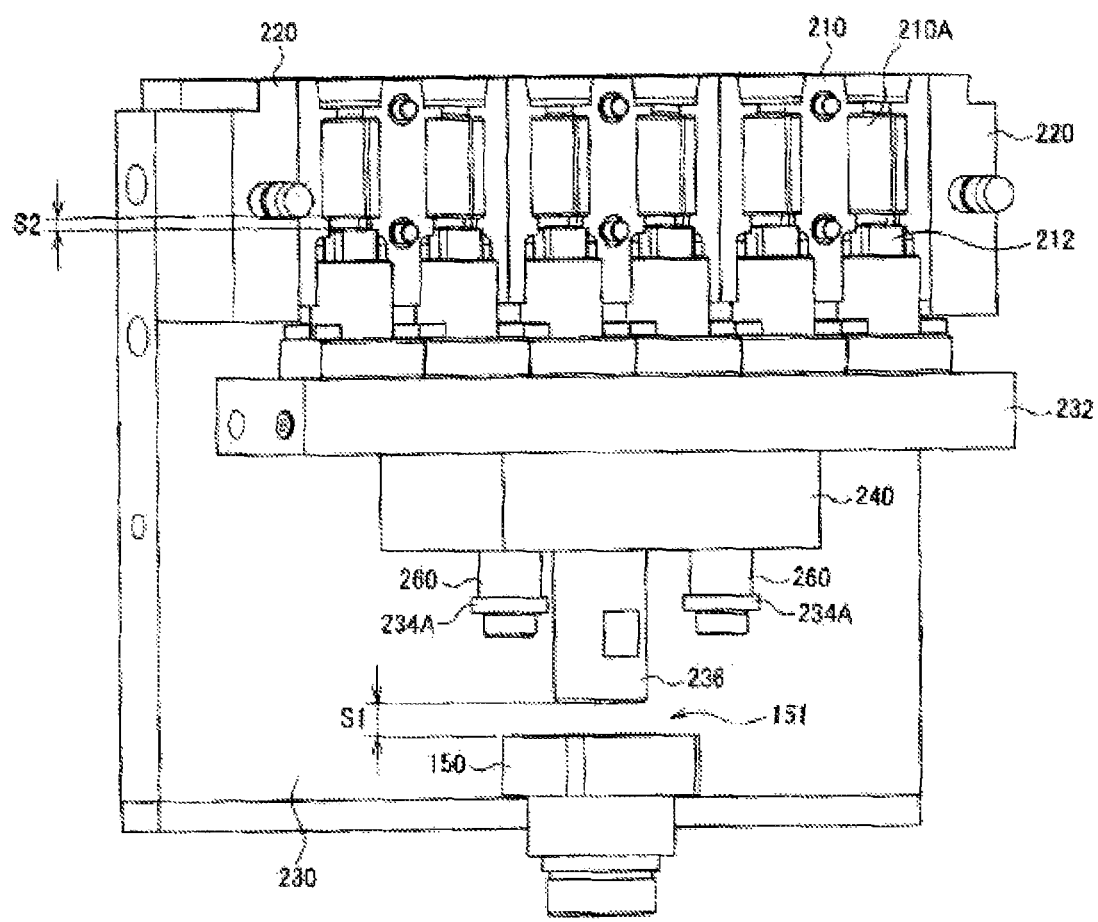
FIG. 7 shows the mold opened state of raised bottom molds mounted on the first fixed plat side.

In the blow mold unit 200 shown in FIG. 4, the blow mold 84 shown in FIG. 2 includes first and second blow cavity split molds 210, 211, and a raised bottom mold 212. The first and second blow cavity split molds 210, 211 respectively have cavities 210A, 211A respectively corresponding to the outer shapes of containers. The first blow cavity split mold 210, as shown in FIG. 5, has a plurality of, for example, six cavities 210A. The second blow cavity split mold 211 also has a plurality of, for example, six cavities 211A. As shown in FIGS. 5 to 7, in the six cavities 210A, 211A defined by the first and second blow cavity split molds 210, 211, there are provided six raised bottom molds 212 which define the shape of the raised bottom.

In FIG. 5, the first blow cavity split mold 210 includes first pressure receiving plates 220, 220 on both sides thereof. Similarly, the second blow cavity split mold 211 includes second pressure receiving plates 221, 221 on both sides thereof, while, in FIG. 4, there is shown one of the second pressure receiving plates 221. The first, second blow cavity split molds 210, 211 and first, second pressure receiving plates 220, 221 are mold clamped by bringing their parting surfaces P into contact with each other. The first and second pressure receiving plates 220, 221 receive mold clamping pressure. Here, in FIGS. 6 and 7, the illustration of the lower portion of the first pressure receiving plate 220 to be fixed to a first fixing plate 230 is omitted.

The blow mold unit 200 includes a first fixing plate 230 to which the first blow cavity split mold 210 and first pressure receiving plate 220 are fixed, and a second fixing plate 231 to which the second blow cavity split mold 211 and second pressure receiving plate 221 are fixed.

The blow mold unit 200 includes a third fixing plate 232 interposed between the first and second fixing plates 230, 231 for fixing the plurality of raised bottom molds 212 to the first surface 232A thereof. To the second surface 232B of the third fixing plate 232 disposed opposed to the first surface 232A, there are fixed at least one, for example, two shaft portions 234 extending vertically from the second surface 232B. Also, to the second surface 232B of the third fixing plate 232, there is fixed an elevating rod 236 (an example of a member to be lifted and lowered) extending vertically from the second surface 232B.

The blow mold unit 200 further includes an elevation guide block 240 fixed to one of the first and second fixing plates 230, 231, for example, the first fixing plate 230 for elevation guiding the two shaft portions 234, 234.

According to this embodiment, in the third fixing plate 232 for fixing the plurality of raised bottom molds 212, at least one shaft portion 234 is held by an elevation guide block 240 in such a manner that it can be lifted and lowered. The elevation guide block 240 is fixed to one of the first and second fixing plates 230, 231, specifically, the first fixing plate 230. Thus, on the first and second fixing plates 230, 231, there are held not only the first and second blow cavity split molds 210, 211 and the first and second pressure receiving plates 220, 221, but also the plurality of raised bottom molds 212 through the elevation guide block 240 and third fixing plate 232, whereby they can be handled as an integral body in the mold replacing operation. That is, in a state where the parting surfaces P of the first and second blow cavity split molds 210, 211 and first and second pressure receiving plates 220, 221 are contacted with each other, the blow mold unit 200 can be carried into and out from the blow molding machine 50 as an integral body.

Further, simply by fixing the first and second fixing plates 220, 221 to the first and second mold clamping plates 81A, 81B of the mold clamping/mold opening device 82 provided in the blow forming machine 50 with a clamping tool shown in FIG. 4 such as a bolt 250, the operation to mount the blow mold unit 200 onto the blow molding machine 50 can be completed. The mold clamping drive of the plurality of raised bottom molds 212 can be realized by the elevating device 150 of the blow molding machine 50 driving the elevating rod 236 extending from the third fixing plate 232. Thus, the elevating rod 236 need not be connected to the elevating device 150.

This embodiment can further include biasing members 260 (for example, compression springs) which move and bias the shaft portions 234 against the elevation guide block 240 to thereby release the plurality of raised bottom molds 212 from the first and second blow cavity split molds 210, 211. Thus, flanges 234A are provided on the end portions of the shaft portions 234 and, between the flanges 234A and the end face (lower surface) of the elevation guide block 240, there are interposed the biasing members 260 while they are inserted through the shaft portions 234.

In this case, since the biasing members 260 can release the plurality of raised bottom molds 212 from the first and second blow cavity split molds 210, 211, after the mold clamping drive of the elevating device 150 is ended, the plurality of raised bottom molds 212 can be released without relying on their own weights or the like.

In this embodiment, the elevation guide block 240, as shown in FIG. 5, can include a penetration hole 241 formed at a central position in the arrangement direction of the plurality of raised bottom molds 212 for inserting the elevating rod therethrough, and plurality of guide holes 242 formed in line symmetrical positions with respect to the central position for elevation guiding the plurality of shaft portions 234. In this case, the mold-clamping and mold-releasing drive of the plurality of raised bottom molds 212 can be carried out stably.

3. Blow Molding Method

Describing a blow molding method using the blow mold unit 200, firstly, FIG. 4 shows a mold opened state where a blow molding operation is ended. In this state, since the first and second mold clamping plates 81A, 81B are opened by first and second mold clamping/mold opening device 82, the first and second blow cavity split molds 210, 211 are opened through the first and second fixing plates 230, 231. Also, since the plurality of raised bottom molds 212 are always pulled toward the elevation guide block 240 due to the action of the biasing members 260, when the elevating device 150 separates from the elevating rod 236, the plurality of raised bottom molds 212 are released automatically. Further, since the elevation guide block 240 fixed to the first fixing plate 230 is also moved laterally, the third fixing plate 232 having the shaft portion 234 supported by the elevation guide block 240 moves the plurality of raised molds 212 laterally as shown in FIG. 4. In this manner, the plurality of raised molds 212 are moved laterally with the mold opening movement of the first fixing plate 230 and are released from positions facing the bottom portions of the plurality of molded containers 126. Thus, with use of the blow mold unit 200, for example, the take-out arm 300 of a take-out device shown in FIG. 4 can be transferred to a position facing the bottom of the container 126 without interfering with the plurality of raised bottom molds 212 or damaging the bottom portion of the container 126. Such take-out device can be preferably used in a blow molding machine that does not include a take-out station 74 as shown in FIG. 1.

After the containers 126 are taken out, a next preform 124 is held by the neck molds 90 and is transferred into the blow mold unit 200. Next, since the first and second mold clamping plates 81A, 81B are mold-closing driven by the mold clamping/mold opening device 82, the first and second blow cavity split molds 210, 211 are closed through the first and second fixing plates 230, 231. In this state, the elevating device 150 has been lowered as shown in FIG. 7. That is, while the plurality of raised bottom molds 212 are released, a clearance 151 can be formed between the elevating rod 236 and elevating device 150. Thus, since the elevating rod 236 and elevating device 150 are disconnected from each other, the mold replacing operation of the blow molt unit 220 is easy. Also, since the elevating rod 236 and elevating device 150 are disconnected from each other, the plurality of raised bottom molds 212 can be laterally moved with the mold-opening movement of the first fixing plate 230.

Before the first and second blow cavity split molds 210, 211 are clamped by the mold clamping/mold opening device 82, the elevating device 150 is lifted from a position shown in FIG. 7 to a position shown in FIG. 6. The elevation stroke of the elevating device 150 provides a length obtained by adding the moving stroke S2 of the raised bottom mold 121 to the length S1 of the clearance 151 between the elevating rod 236 and elevating device 150. Thus, before the first and second blow cavity split molds 210, 211 are clamped, the plurality of raised bottom molds 212 can be clamped. After then, when the first and second blow cavity split molds 210, 211 are clamped, the blow molding operation is started.

When the blow molding operation is ended, the opening of the first and second blow cavity split molds 210, 211 and the opening of the plurality of raised bottom molds 212 are started almost simultaneously, or the opening of the plurality of raised bottom molds 212 is started earlier. Since the plurality of raised bottom molds 212 are moved laterally by the first fixing plate 230, the plurality of raised bottom molds 212 must be moved laterally after they are completely separated from the bottom portions of the containers 126. The opening of the plurality of raised bottom molds 212 can be reliably carried out by the biasing force of the biasing member 260 by lowering the elevating device 150.

4. Modified Example of Blow Mold Unit

Figure 8:
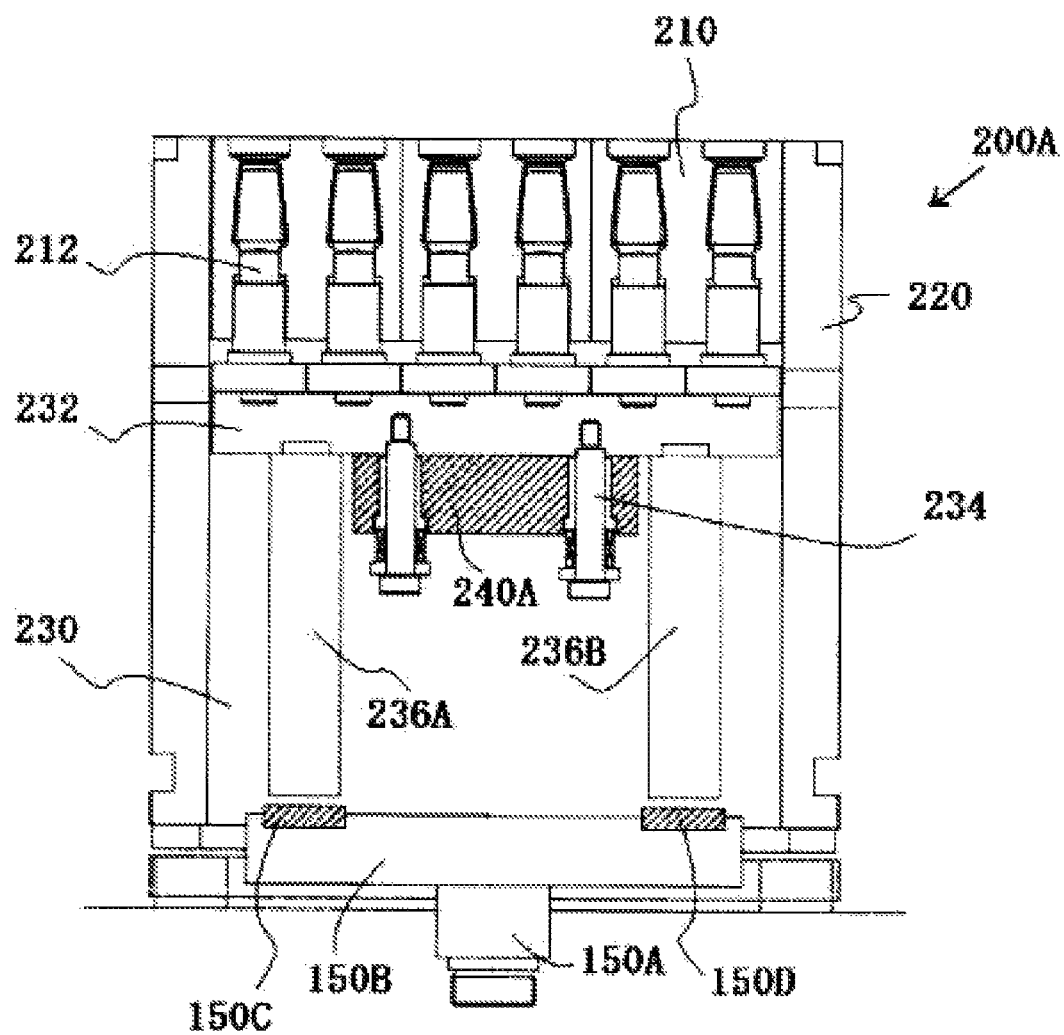
FIG. 8 is a view of another embodiment of the blow mold unit.

Next, description is given of a modified example of the blow mold unit according to the invention with reference to FIG. 8. A blow mold unit 200A shown in FIG. 8 is common with the blow mold unit 200 described with reference to FIGS. 4 to 7 in that it includes: the first and second blow cavity split molds 210, 211; raised bottom molds 212; first and second pressure receiving plates 220, 221; first and second fixing plates 230, 231; and, a third fixing plate 232, and the like, similarly to the above-described blow mold unit 200. The same composing elements are given the same designations and thus the description thereof is omitted.

The blow mold unit 200A of the modified example is different from the above-mentioned blow mold unit 200 in that at least two elevating rods 236A, 236B (an example of an elevated member) are disposed to sandwich an elevation guide block 240A between them. That is, the two elevating rods 236A, 236B do not penetrate through the elevation guide block 240A, nor the elevation guide block 240A includes a penetration hole through which the elevating rod is inserted. Thus, the elevation guide block 240A of the blow mold unit 200A of the modified example is interposed between at least two elevating rods 236A, 236B.

The elevating device 150A includes a plate-shaped elevating spacer member 150B. The plate-shaped elevating spacer member 150B has two contact portions respectively contactable with the bottom portions of the two elevating rods 236A, 236B, while elastic members 150C, 150D are provided on the respective contact portions.

In this manner, when there is employed a structure for lifting and lowering and pressurizing the third fixing plate 232 and raised bottom molds 212 at the two contact points, the lifting and lowering operation can be stabilized further and the opening or shifting of the molds possibly caused by high-pressure blow air can be prevented.

Also, since no penetration hole is formed in the elevation guide block 240A, the rigidity thereof can be enhanced and the machining thereof can be facilitated. In this modified example, since elastic members are provided in the contact portions between the elevating spacer member 150B and elevating rods 236A, 236B, shocks generated when they are contacted can be reduced and the damage of the related members is harder to occur. Also, no metal powder due to friction is generated. Incidentally, even with a structure excluding the elastic member, the lifting and lowering operation can be stabilized.

Although description has been given specifically of the embodiment, it is easy for a person skilled in the art to understand that various modifications are possible without departing substantially from the new matters and effects of the invention. Therefore, such modifications are to fall under the scope of the invention. For example, any terms used at least once together with different terms of broader or synonymous sense in the specification or drawings can be replaced with such different terms in any portions of the specification and drawings.

For example, the invention is not limited to a blow molding machine of a rotation transfer type but can also be applied similarly to a blow molding machine of a horizontal transfer type. The invention also can be applied to a blow molding machine which transfers a preform into a blow molding station while the preform is inverted. In this case, the biasing member 260 is essential.

The present application is based on Japanese Patent Application No. 2011-228855 filed on Oct. 18, 2011, and the contents thereof are incorporated herein for reference.

DESCRIPTION OF REFERENCE NUMERALS AND SIGNS

50: blow molding machine
54: base (lower base)
81A, 81B: first and second mold clamping plates
82: mold clamping/mold opening device (blow mold clamping mechanism)
84: blow mold
150: elevating device
151: clearance
200: blow mold unit
211, 212: first and second blow cavity split mold
212: raised bottom mold
220: first pressure receiving plate
221: second pressure receiving plate
230: first fixing plate
231: second fixing plate
232: third fixing plate
232A: first surface
232B: second surface
234: shaft portion
236: elevated member (elevating rod)
240: elevation guide block
241: penetration hole
242: guide hole
250: bolt
260: biasing member
300: take-out arm

The invention claimed is:

1. A blow mold unit comprising:
a blow mold including first and second blow cavity split molds to be clamped by bringing parting surfaces thereof into contact with each other, and a plurality of raised bottom molds that define a plurality of raised bottom shapes for a plurality of cavities defined by the first and second blow cavity split molds;
first and second pressure receiving plates that receive mold clamping pressure by bringing parting surfaces thereof into contact with each other;
a first fixing plate to which the first blow cavity split mold and the first pressure receiving plate are fixed;
a second fixing plate to which the second blow cavity split mold and the second pressure receiving plate are fixed;
a third fixing plate interposed between the first and second fixing plates and to which the plurality of raised bottom molds are fixed at a first surface thereof;
at least one shaft portion extending vertically from a second surface of the third fixing plate opposed to the first surface;
an elevation guide block fixed to one of the first and second fixing plates and elevation guiding the shaft portion; and
at least two elevated members extending vertically from the second surface of the third fixing plate without penetrating through the elevation guide block.

2. The blow mold unit according to claim 1, further comprising: a biasing member that biases the shaft portion with respect to the elevation guide block to release the plurality of raised bottom molds from the first and second blow cavity split molds.

3. The blow mold unit according to claim 2,
wherein the elevation guide block includes a plurality of guide holes which are formed at line symmetrical positions with respect to a central position of an arranging direction of the plurality of raised bottom molds and elevation guide the plurality of shaft portions.

4. The blow mold unit according to claim 1,
wherein the elevation guide block is interposed between the at least two elevated members.

5. A blow molding machine comprising:
a base;
a blow mold unit which is supported on the base and comprises:
a blow mold including first and second blow cavity split molds to be clamped by bringing parting surfaces thereof into contact with each other, and a plurality of raised bottom molds that define a plurality of raised bottom shapes for a plurality of cavities defined by the first and second blow cavity split molds;
first and second pressure receiving plates that receive mold clamping pressure by bringing parting surfaces thereof into contact with each other;
a first fixing plate to which the first blow cavity split mold and the first pressure receiving plate are fixed;
a second fixing plate to which the second blow cavity split mold and the second pressure receiving plate are fixed;
a third fixing plate interposed between the first and second fixing plates and to which the plurality of raised bottom molds are fixed at a first surface thereof;
at least one shaft portion extending vertically from a second surface of the third fixing plate opposed to the first surface;
an elevation guide block fixed to one of the first and second fixing plates and elevation guiding the shaft portion; and
at least two elevated members extending vertically from the second surface of the third fixing plate without penetrating through the elevation guide block, which is supported on the base,
wherein the blow molding machine further comprises:
a mold clamping/mold opening device provided on the base and drives the first and second fixing plates of the blow mold unit to clamp/open the first and second blow cavity split molds; and
an elevating device that elevation drives the elevated members of the blow mold unit to lift and lower the plurality of raised bottom molds of the blow mold unit.

6. The blow molding machine according to claim 5, wherein, when the plurality of raised bottom molds are released, a clearance is formed between the elevated members and the elevating device.

7. The blow molding machine according to claim 5, further including a take-out device that takes out a plurality of containers blow molded by the blow molding machine after the first and second blow cavity split molds are opened, wherein the take-out device includes a take-out arm that can be carried into an area facing bottom portions of the plurality of containers.

8. A blow molding machine comprising a blow mold unit and an elevating device, the blow mold unit comprising:
 a blow mold including first and second blow cavity split molds to be clamped by bringing parting surfaces thereof into contact with each other, and a plurality of raised bottom molds that define a plurality of raised bottom shapes for a plurality of cavities defined by the first and second blow cavity split molds;
 first and second pressure receiving plates that receive mold clamping pressure by bringing parting surfaces thereof into contact with each other;
 a first fixing plate to which the first blow cavity split mold and the first pressure receiving plate are fixed;
 a second fixing plate to which the second blow cavity split mold and the second pressure receiving plate are fixed;
 a third fixing plate interposed between the first and second fixing plates and to which the plurality of raised bottom molds are fixed at a first surface thereof;
 at least one shaft portion extending vertically from a second surface of the third fixing plate opposed to the first surface;
 an elevation guide block fixed to one of the first and second fixing plates and elevation guiding the shaft portion;
 at least two elevated members extending vertically from the second surface of the third fixing plate without penetrating through the elevation guide block; and
 an elevating device that elevation drives the at least two elevated members of the blow mold unit to lift and lower the plurality of raised bottom molds of the blow mold unit, and
 wherein the elevating device includes an elevating spacer member contactable with the at least two elevated members and including an elastic member.

\* \* \* \* \*